United States Patent
Kamata et al.

(10) Patent No.: US 11,378,948 B2
(45) Date of Patent: Jul. 5, 2022

(54) REMOTE CONTROL SYSTEM AND SELF-DRIVING SYSTEM

(71) Applicant: Toyota Jidosha Kabushiki Kaisha, Toyota (JP)

(72) Inventors: Nobuhide Kamata, Susono (JP); Yasuo Uehara, Gotemba (JP); Nozomu Hatta, Susono (JP); Shunsuke Tanimori, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 136 days.

(21) Appl. No.: 16/801,823

(22) Filed: Feb. 26, 2020

(65) Prior Publication Data
US 2020/0301409 A1  Sep. 24, 2020

(30) Foreign Application Priority Data
Mar. 19, 2019 (JP) .............................. JP2019-051754

(51) Int. Cl.
*G05D 1/00* (2006.01)
(52) U.S. Cl.
CPC .................................. *G05D 1/0016* (2013.01)
(58) Field of Classification Search
CPC ............... G05D 1/0016; G05D 1/0027; G05D 2201/0213
USPC .......................................................... 701/2
See application file for complete search history.

(56) References Cited

U.S. PATENT DOCUMENTS

| 10,268,191 B1* | 4/2019 | Lockwood ............ G05D 1/0027 |
| 2018/0050704 A1* | 2/2018 | Tascione .............. G05D 1/0061 |
| 2018/0224850 A1* | 8/2018 | Kroop ............... G08G 1/096725 |
| 2018/0231982 A1 | 8/2018 | Yunoki et al. |
| 2020/0192351 A1* | 6/2020 | Rastoll ................. G05D 1/0027 |

FOREIGN PATENT DOCUMENTS

| JP | 2017-163253 A | 9/2017 |
| JP | 2017-182137 A | 10/2017 |
| JP | 2019-021200 A | 2/2019 |
| WO | 2017/077621 A1 | 5/2017 |

* cited by examiner

*Primary Examiner* — Muhammad Shafi
(74) *Attorney, Agent, or Firm* — Dinsmore & Shohl LLP (57) ABSTRACT

A remote control system able to remotely control an autonomously driving vehicle, comprises a communication device able to communicate with the vehicle, an input device to be operated by an operator for intervening in control of the vehicle, a margin calculating part configured to calculate an operator intervention margin showing a possibility of an operator being able to intervene in control of the vehicle, and an instructing part configured to send the vehicle instructions relating to control of the vehicle through the communication device. The instructing part is configured to send the vehicle instructions from the operator when the input device is operated by the operator and send the vehicle an instruction for changing a driving plan of the vehicle when the operator intervention margin is equal to or less than a predetermined value.

10 Claims, 9 Drawing Sheets

REMOTE CONTROL SYSTEM AND SELF-DRIVING SYSTEM

CROSS-REFERENCE TO RELATED APPLICATIONS

The present application claims priority to Japanese Patent Application No. 2019-051754 filed Mar. 19, 2019, the contents of which are incorporated herein by reference in its entirety.

FIELD

The present disclosure relates to a remote control system and a self-driving system.

BACKGROUND

Known in the past has been a vehicle configured to transport passengers by autonomous driving. PTL 1 describes an on-demand bus operating in response to demand for use by users.

CITATIONS LIST

Patent Literature

[PTL 1] Japanese Unexamined Patent Publication No. 2017-182137

SUMMARY

Technical Problem

In a conventional vehicle operated by a driver, the driver performs suitable operations for running the vehicle in accordance with the situation around the vehicle etc. On the other hand, an autonomous driving vehicle like the on-demand bus described in PTL 1 has no driver. For this reason, in this vehicle, a control device provided in the vehicle has to suitably control the vehicle.

However, if the vehicle runs into an unforeseen situation, it is difficult for the control device to suitably control the vehicle. For example, if a traffic light is broken and it is necessary for a policeman to use hand signals to direct the vehicle, it would be difficult for the control device to suitably control the vehicle. In such a case, to secure the safety of the vehicle, human intervention in the control of the vehicle would be desired.

For this reason, it may be considered to station operators for monitoring vehicles at a support center and have the operators remotely control the vehicles through a remote control system. However, if a limited number of operators simultaneously monitor numerous vehicles, an operator is liable to be unable to intervene in control of a vehicle at the desired timing. Further, if a communication problem etc., results in communication between a vehicle and remote control system being cut, the operator cannot intervene in control of the vehicle. If the vehicle runs up against an unforeseen situation when the operator cannot intervene in control of the vehicle, suitable control will not be performed and the vehicle will become less safe.

In consideration of the above problem, an object of the present disclosure is to keep an autonomously drivable vehicle from becoming less safe when an operator cannot intervene in control of the vehicle.

Solution to Problem

The summary of the present disclosure is as follows.

(1) A remote control system able to remotely control an autonomously driving vehicle, comprising: a communication device able to communicate with the vehicle; an input device to be operated by an operator for intervening in control of the vehicle; a margin calculating part configured to calculate an operator intervention margin showing a possibility of an operator being able to intervene in control of the vehicle; and an instructing part configured to send the vehicle instructions relating to control of the vehicle through the communication device, wherein the instructing part is configured to send the vehicle instructions from the operator when the input device is operated by the operator and send the vehicle an instruction for changing a driving plan of the vehicle when the operator intervention margin is equal to or less than a predetermined value.

(2) The remote control system described in above (1), wherein the margin calculating part is configured to lower the operator intervention margin when the number of operators able to operate the input device for intervening in control of the vehicle is relatively small compared to when the number of operators is relatively large.

(3) The remote control system described in above (1) or (2), wherein the margin calculating part is configured to lower the operator intervention margin when a quality of communication between the remote control system and the vehicle is relatively poor compared with when the quality of communication is relatively good.

(4) The remote control system described in any one of above (1) to (3), wherein the instructing part is configured to send the vehicle an instruction for making the vehicle stop when the operator intervention margin is equal to or less than the predetermined value.

(5) The remote control system described in above (4), wherein the instructing part is configured to send the vehicle an instruction for making the vehicle stop when a confidence showing a possibility of the vehicle being able to continue autonomous driving without intervention by the operator is equal to or less than a threshold value and the operator intervention margin is equal to or less than the predetermined value.

(6) The remote control system described in any one of above (1) to (3), wherein when the operator intervention margin is equal to or less than the predetermined value, the instructing part is configured to send the vehicle an instruction for changing a driving route of the vehicle so that a confidence showing a possibility of the vehicle being able to continue autonomous driving without intervention by the operator becomes higher.

(7) The remote control system described in any one of above (1) to (3), wherein the instructing part is configured to send the vehicle an instruction for changing a driving route of the vehicle so that a confidence showing a possibility of the vehicle being able to continue autonomous driving without intervention by the operator becomes higher when the operator intervention margin is equal to or less than a first predetermined value, and send the vehicle an instruction for making the vehicle stop when the operator intervention margin is equal to or less than a second predetermined value, and the second predetermined value is smaller than the first predetermined value.

(8) The remote control system described in any one of above (1) to (3), wherein when the operator intervention margin is equal to or less than the predetermined value, the instructing part is configured to send the vehicle an instruction for lowering an upper limit speed of the vehicle.

(9) A self-driving system comprising an autonomously driving vehicle and a remote control system able to remotely control the vehicle, wherein the remote control system comprises: a communication device able to communicate with the vehicle; an input device to be operated by an operator for intervening in control of the vehicle; a margin calculating part configured to calculate an operator intervention margin showing a possibility of an operator being able to intervene in control of the vehicle, and an instructing part configured to send the vehicle instructions relating to control, of the vehicle through the communication device; and the instructing part is configured to send the vehicle instructions from the operator when the input device is operated by the operator and send the vehicle an instruction for changing a driving plan of the vehicle when the operator intervention margin is equal to or less than a predetermined value.

Effects of Present Disclosure

According to the present disclosure, it is possible to keep an autonomously drivable vehicle from becoming less safe when an operator cannot intervene in control of the vehicle.

DESCRIPTION OF EMBODIMENTS

Below, referring to the drawings, embodiments of the present disclosure will be explained. Note that, in the following explanation, similar component elements are assigned the same reference signs.

First Embodiment

Figure 1:
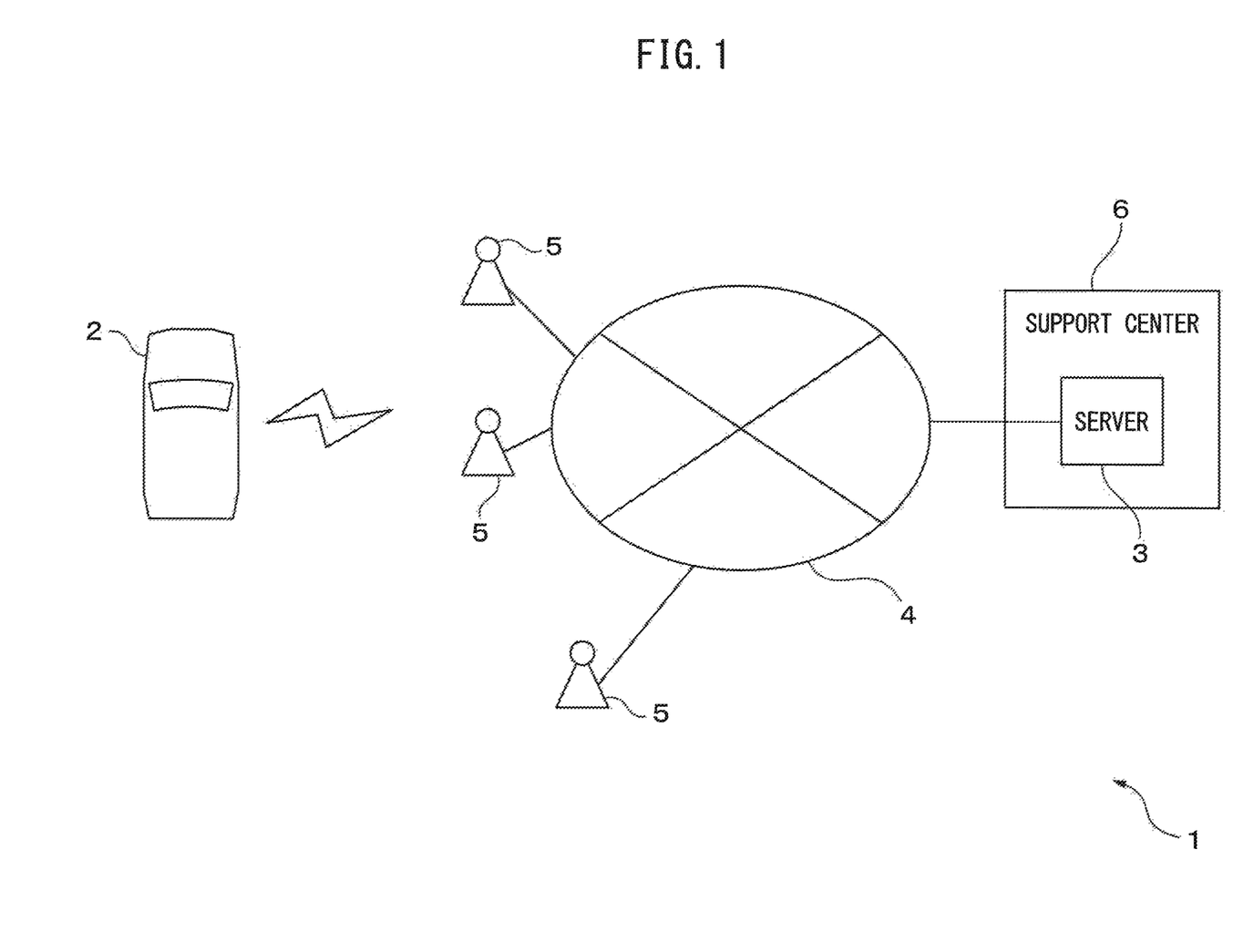
FIG. 1 is a schematic view of the configuration of a self-driving system according to a first embodiment of the present disclosure.

Below, referring to FIG. 1 to FIG. 9, a first embodiment of the present disclosure will be explained. FIG. 1 is a schematic view of the configuration of a self-driving system according to the first embodiment of the present disclosure.

The self-driving system 1 is provided with a vehicle 2 and a server 3. The server 3 is provided at the outside of the vehicle 2. The vehicle 2 and server 3 can communicate with each other.

The vehicle 2 is configured to autonomously run. Therefore, the vehicle 2 is a so-called "self-driving vehicle". No driver is required for operating the vehicle 2. For example, the vehicle 2 provides a car share service, ride share service, or other mobility service. Specifically, the vehicle 2 transports the user and other passengers to a desired destination in accordance with a request for car dispatch from the user. In a ride share service, a plurality of users with close destinations can simultaneously utilize a single vehicle 2.

Note that, the vehicle 2 may be owned by a specific user and may be utilized by only the specific user. Further, the vehicle 2 may be a delivery vehicle transporting goods.

Figure 2:
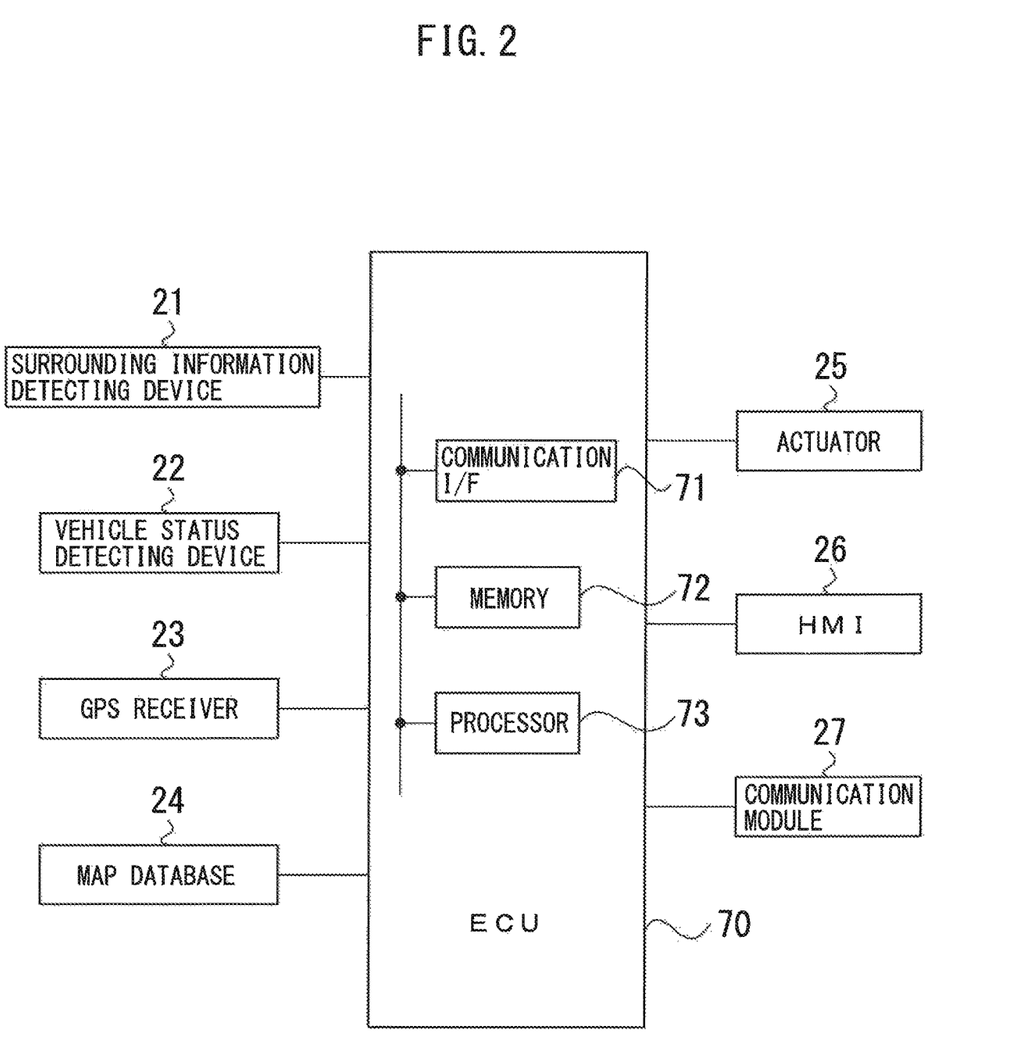
FIG. 2 is a view schematically showing the configuration of a vehicle.

FIG. 2 is a view schematically showing the configuration of the vehicle 2. The vehicle 2 is provided with an electronic control unit (ECU) 70. The ECU 70 includes a communication interface 71, memory 72, and processor 73 and performs various types of control of the vehicle 2. The communication interface 71 and memory 72 are connected through signal wires to the processor 73. Note that, in the present embodiment, one ECU 70 is provided, but it is also possible that a plurality of ECUs be provided for the different functions. The ECU 70 is one example of a control device of the vehicle 2.

The communication interface 71 has an interface circuit for connecting the ECU 70 to an internal vehicle network based on the CAN (controller area network) etc. The ECU 70 communicates through the communication interface 71 with other vehicle-mounted devices.

The memory 72, for example, has a volatile semiconductor memory (for example, RAM) and nonvolatile semiconductor memory (for example, ROM). The memory 72 stores programs to be run at the processor 73, various types of data used when the processor 73 performs various processing, etc.

The processor 73 has one or more CPUs (central processing units) and their peripheral circuits and performs various processing. Note that, the processor 73 may further have processing circuits such as arithmetic logic units or numerical calculation units.

Further, the vehicle 2 is provided with a surrounding information detecting device 21. The surrounding information detecting device 21 detects information on the surroundings of the vehicle 2 for autonomous driving of the vehicle 2. The information on the surroundings includes white lines of the roads, other vehicles, pedestrians, bicycles, buildings, road signs, traffic lights, obstacles, etc. The surrounding information detecting device 21 is connected through the internal vehicle network to the ECU 70. The output of the surrounding information detecting device 21 is transmitted to the ECU 70. For example, the surrounding information detecting device 21 includes an outside camera, milliwave radar, LIDAR (laser imaging detection and ranging) device, ultrasonic wave sensor, etc. The outside camera captures an image of the outside of the vehicle 2 to generate an image of the surrounding of the vehicle 2.

Further, the vehicle 2 is provided with a vehicle status detecting device 22. The vehicle status detecting device 22 detects the status of the vehicle 2 for autonomous driving of the vehicle 2. The vehicle status detecting device 22 is connected through the internal vehicle network to the ECU 70. The output of the vehicle status detecting device 22 is transmitted to the ECU 70. For example, the vehicle status detecting device 22 includes a vehicle speed sensor, yaw rate sensor, etc. The vehicle speed sensor detects the speed of the vehicle 2. The yaw rate sensor detects the rotational speed about the vertical axis passing through the center of gravity of the vehicle 2 as the yaw rate.

Further, the vehicle 2 is provided with a GPS receiver 23. The GPS receiver 23 receives signals from three or more (IPS satellites and detects the current position of the vehicle 2 (for example, the latitude and longitude of the vehicle 2). The GPS receiver 23 is connected through the internal vehicle network to the ECU 70. The output of the GPS receiver 23 is transmitted to the ECU 70.

Further, the vehicle 2 is provided with a map database 24. The map database 24 stores map information. The map information includes positional information of roads, shape information of roads (for example whether curved or straight, radii of curvature of curves, road gradients, etc.), road types, speed limits, and other road information. The map database 24 is connected through the internal vehicle network to the ECU 70. The ECU 70 acquires the map information from the map database 24. The map information stored in the map database 24 is updated using data received from outside of the vehicle 2, SLAM (simultaneous localization and mapping) technology, etc.

Further, the vehicle 2 is provided with an actuator 25. The actuator 25 makes the vehicle 2 operate. The actuator 25 is connected through the internal vehicle network to the ECU 70. The ECU 70 controls the actuator 25. For example, the actuator 25 includes a drive device for accelerating the vehicle 2 (at least one of an engine and motor), a brake actuator for braking the vehicle 2, a steering motor for steering the vehicle 2, etc.

Further, the vehicle 2 is provided with a human machine interface (HMI) 26. The HMI 26 is an input-output device for inputting and outputting information between a passenger of the vehicle 2 and the vehicle 2. The HMI 26, for example, includes a display displaying information, a speaker generating a sound, operating buttons or a touch screen for a passenger to input operations, a microphone for receiving a voice of the passenger. The HMI 26 provides a passenger of the vehicle 2 with information (current position of the vehicle 2, weather, outside air temperature, etc.) and entertainment (music, movies, TV shows, games, etc.). The HMI 26 is connected through the internal vehicle network to the ECU 70, the output of the ECU 70 is conveyed through the HMI 26 to the passenger, and input from the passenger is sent through the HMI 26 to the ECU 70.

Further, the vehicle 2 is provided with a communication module 27. The communication module 27 can communicate with the outside of the vehicle 2, and therefore the vehicle 2 can communicate with the outside of the vehicle 2. The communication module 27, for example, includes a data communication module (DCM) and a short distance wireless communication module (for example, WiFi module, Bluetooth® module, etc.). The vehicle 2 communicates with the server 3 through the data communication module, wireless base station 5, and communication network 4. Further, the vehicle 2 communicates with a mobile phone of a passenger of the vehicle 2, roadside devices, other vehicles, etc., through the short distance wireless module.

As shown in FIG. 1, the server 3 is provided at a support center 6 for supporting autonomous driving of the vehicle 2. At the support center 6, operators are stationed for supporting autonomous driving of the vehicle 2. An operator monitors the vehicle 2 through the server 3 and intervenes in control of the vehicle 2 in accordance with need. The server 3 can send the vehicle 2 instructions relating to control of the vehicle 2 to thereby remotely control the vehicle 2. The server 3 is one example of a remote control system able to remotely control the vehicle 2.

Figure 3:
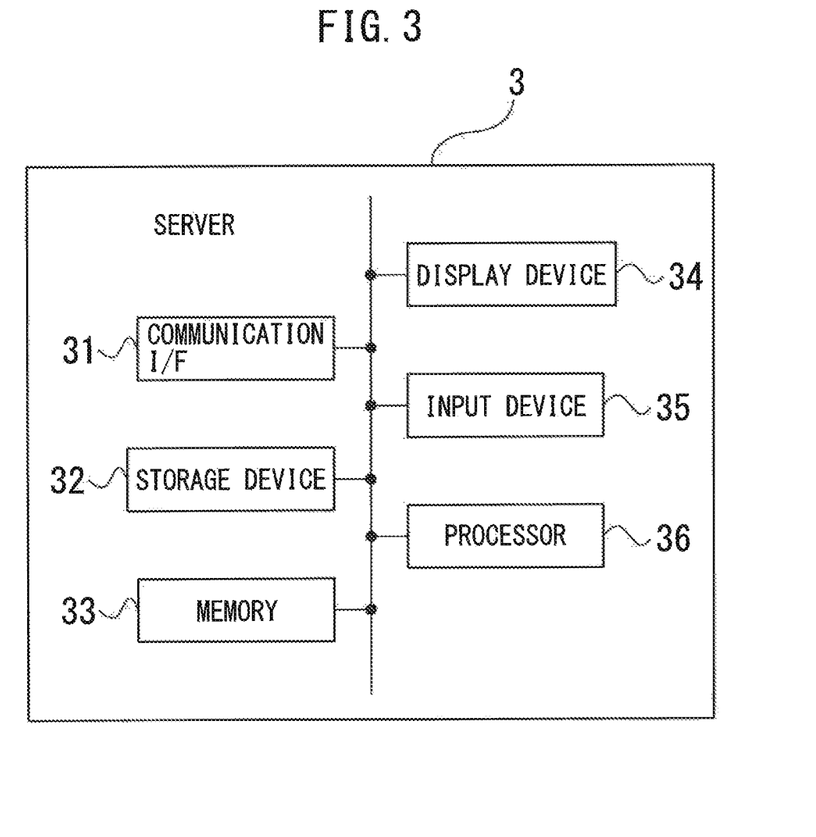
FIG. 3 is a view schematically showing the configuration of a server.

FIG. 3 is a view schematically showing the configuration of the server 3. As shown in FIG. 3, the server 3 is provided with a communication interface 31, storage device 32, memory 33, display device 34, input device 35, and processor 36. The communication interface 31, storage device 32, memory 33, display device 34, and input device 35 are connected through signal wires to the processor 36. Note that, the server 3 may be configured from a plurality of computers.

The communication interface 31 has an interface circuit for connecting the server 3 to the communication network 4. For this reason, the communication interface 31 can communicate with the outside of the server 3 (vehicle 2, other vehicles, other servers, etc.), and enables the server 3 to communicate with outside of the server 3. The communication interface 31 is one example of a communication device.

The storage device 32, for example, has a hard disk drive (HDD), solid state drive (SSD), optical recording medium, etc. The storage device 32 stores various types of data and, for example, stores vehicle information (identification information, position, driving route, etc., of the vehicle 2), map information, computer programs for the processor 36 to run for performing various processing, etc. The storage device 32 is one example of a storage device.

The memory 33, for example, has a semiconductor memory such as a random access memory (RAM). The memory 33, for example, stores various types of data etc., used when the processor 36 performs various types of processing. The memory 33 is one example of a storage device.

The display device 34 has one or more displays. The display device 34 displays information required for an operator to assist autonomous driving of the vehicle 2. For example, an image of the surroundings of the vehicle 2 generated by the outside camera of the surrounding information detecting device 21 is periodically sent from the vehicle 2 to the server 3. The display device 34 displays the image of the surroundings of the vehicle 2 sent from the vehicle 2. Further, together with the current position of the vehicle 2, the driving route of the vehicle 2, and the state of traffic on the roads around the driving route of the vehicle 2 (for example, any congestion, any accidents, any fallen objects, any broken down vehicles, any construction work, etc.), map information of the surroundings of the vehicle 2 may be displayed at the display device 34.

The input device 35 has a keyboard, mouse, microphone, etc. The input device 35 is operated by an operator for intervention in control of the vehicle 2. An operator intervenes in control of the vehicle 2 through the input device 35 in accordance with need based on the information displayed on the display device 34. When intervening in control of the vehicle 2, an operator operates the input device 35 and inputs an instruction relating to control of the vehicle 2 to the input device 35.

Note that, the input device 35 may have a steering wheel, accelerator pedal, and brake pedal. In this case, an operator operates the input device 35 as if he or she operated the actual vehicle, to thereby input instructions relating to control of the vehicle 2 to the input device 35.

The processor 36 has one or more CPUs (central processing units) and their peripheral circuits and performs various processing. Note that, the processor 36 may further have processing circuits such as arithmetic logic units or numerical calculation units.

As explained above, the vehicle 2 is configured to autonomously run. Specifically, the ECU 70 provided at the vehicle 2 performs control for making the vehicle 2 autonomously run. For example, when the vehicle 2 transports a passenger, the ECU 70 first determines the driving route to the destination based on the current position of the vehicle 2 detected by the GPS receiver 23, the map information of the map database 24, and the destination input by a passenger through the HMI 26, a mobile phone, etc. Next, the ECU 70 controls the actuator 25 based on the output of the surrounding information detecting device 21, the output of the vehicle status detecting device 22, etc., so that the vehicle 2 runs along the driving route.

However, if the vehicle 2 runs into an unforeseen situation, it is difficult for the ECU 70 to suitably control the vehicle 2. For example, if a traffic light is broken and it is necessary for a policeman to use hand signals to direct the vehicle 2, it would be difficult for the ECU 70 to suitably control the vehicle 2.

For this reason, in the present embodiment, if necessary, an operator stationed at the support center 6 intervenes in control of the vehicle 2 through the server 3. By doing this, even in a state which the ECU 70 is unable to judge, the safety of the vehicle 2 can be secured.

However, the server 3 is sent information from a plurality of vehicles. A limited number of operators have to simultaneously monitor pluralities of vehicles. Therefore, an operator is liable to be unable to intervene in control of the vehicle 2 at a desired timing. Further, if a communication problem etc., results in communication between the vehicle 2 and server 3 being cut, an operator cannot intervene in control of the vehicle 2. If the vehicle 2 runs up against an unforeseen situation when an operator cannot intervene in control of the vehicle 2, suitable control will not be performed and the vehicle 2 will become less safe.

Figure 4:
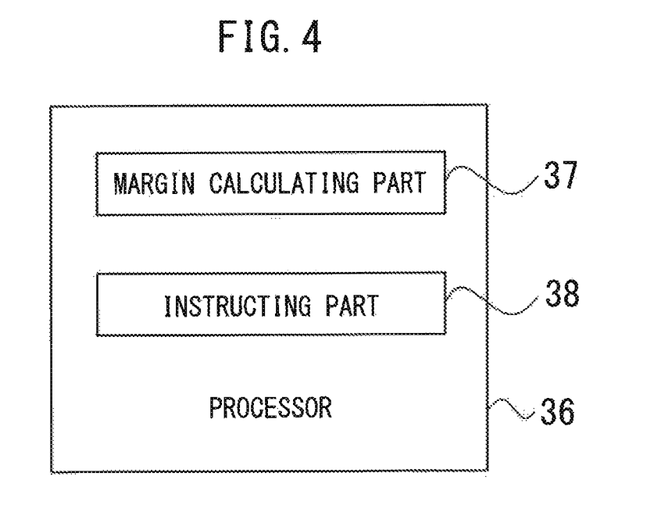
FIG. 4 is a functional block diagram of a processor of a server.

As opposed to this, in the present embodiment, the possibility of an operator being able to intervene in control of the vehicle 2 is considered and the following control is performed by the server 3. FIG. 4 is a functional block diagram of the processor 36 of server 3. In the present embodiment, the processor 36 has a margin calculating part 37 and an instructing part 38.

The margin calculating part 37 and the instructing part 38 are respectively functional modules realized by a program stored in the storage device 32 being run by the processor 36. Note that, the margin calculating part 37 and the instructing part 38 respectively may be dedicated processing circuits provided at the processor 36.

The margin calculating part 37 calculates an operator intervention margin showing the possibility of an operator being able to intervene in control of the vehicle 2 (below, simply referred to as the "margin"). The shorter the estimated value of the time from when the vehicle 2 runs into an unforeseen situation to when an operator can intervene in control of the vehicle 2, the higher the margin. On the other hand, the longer the estimated value of the time from when the vehicle 2 runs into an unforeseen situation to when an operator can intervene in control of the vehicle 2, the lower the margin.

The instructing part 38 sends the vehicle 2 an instruction relating to control of the vehicle 2 through the communication interface 31 of the server 3. Specifically, when the input device 35 of the server 3 is operated by an operator, the instructing part 38 sends the vehicle 2 an instruction from the operator. Further, when the margin calculated by the margin calculating part 37 is equal to or less than a predetermined value, the instructing part 38 sends the vehicle 2 an instruction for changing the driving plan of the vehicle 2. By doing this, in a vehicle 2 able to autonomously run, it is possible to keep the safety of the vehicle 2 from falling when an operator cannot intervene in control of the vehicle 2.

<Processing for Calculating Margin>

Figure 5:
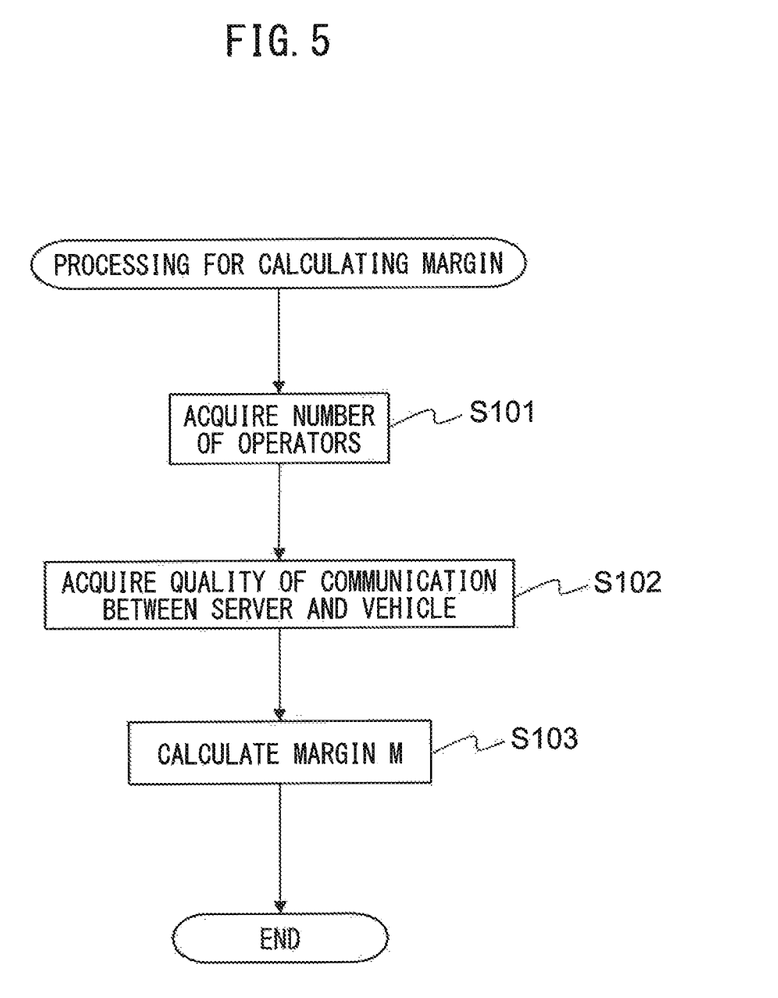
FIG. 5 is a flow chart showing a control routine of processing for calculating a margin in the first embodiment.

Below, referring to FIG. 5 to FIG. 9, the above control will be explained in detail. FIG. 5 is a flow chart showing a control routine of processing for calculating a margin in the first embodiment. The control routine is repeatedly performed by the processor 36 of the server 3, specifically the margin calculating part 37, at predetermined intervals.

First, at step S101, the margin calculating part 37 acquires the number of operators available to operate the input device 35 of the server 3 for intervening in control of the vehicle 2 (below, simply referred to as the "number of available operators"). Specifically, the margin calculating part 37 acquires the number of operators in a standby state as the number of available operators.

For example, the operator inputs to the input device 35 an input showing the standby state when sitting down at a seat for operating the input device 35 and inputs to the input device 35 an input showing the non-standby state when leaving the seat for operating the input device 35. Further, when the input device 35 is operated by the operator, the state of the operator is changed from the standby state to the non-standby state by the input device 35. Next, when the input device 35 has not been operated by an operator for a predetermined time, the state of the operator is changed from the non-standby state to the standby state by the input device 35. The states of the operators are stored in the storage device 32 or memory 33 of the server 3, therefore the margin calculating part 37 can acquire the number of operators in a standby state.

Note that, a monitor camera capturing the operators etc., may be used to judge the statuses of the operators. Further, the margin calculating part 37 may acquire the ratio of operators in the standby state as the number of available operators. The ratio of the operators in the standby state is the ratio of the number of operators in the standby state with respect to the total number of the operators. Further, if at least a part of the vehicles which the operators are in charge of are different, the margin calculating part 37 acquires the number of operators in the standby state or the ratio of operators in the standby state as the number of available operators for the operators in charge of the vehicle 2.

Next, at step S102, the margin calculating part 37 acquires a quality of communication between the server 3 and the vehicle 2. The quality of communication is converted to a numerical value. The value of the quality of communication is set to become larger the better the quality of communication. For this reason, at step S102, the margin calculating part 37 acquires the value of the quality of communication between the server 3 and the vehicle 2.

In the present embodiment, information relating to the vehicle 2 (image of surroundings of the vehicle 2, current position of the vehicle 2, etc.) is periodically sent from the vehicle 2 to the server 3. However, if a problem in communication etc., causes communication between the server 3 and the vehicle 2 to be unable to be secured, the server 3 cannot receive information from the vehicle 2. For this reason, for example, the margin calculating part 37 acquires the number of times the server 3 has received information from the vehicle 2 in a predetermined time up to the present as the value of the quality of communication. In this case, this number is stored in the storage device 32 or the memory 33 of the server 3 and periodically updated.

Further, the information showing the quality of communication between the server 3 and the vehicle 2 may be periodically sent from the vehicle 2 to the server 3 and the margin calculating part 37 may acquire this information as the value of the quality of communication. This information is, for example, a value showing the signal status of a wireless signal received by the vehicle 2 from a wireless base station 5. For example, this value is calculated from a signal showing the strength of a wireless signal received by the vehicle 2 from the wireless base station 5 (for example, received signal strength indicator (RSSI) or reference signal received power (RSRP)), a signal showing the quality of the wireless signal received by the vehicle 2 from the wireless base station 5 (for example, signal to interference plus noise ratio (SINR) or bit error rate) etc. Note that, this value is set so as to become larger the better the signal state of the wireless signal.

Further, a value of the quality of communication determined for each predetermined zone may be stored as a part of the map information in the storage device 32 of the server 3, and the margin calculating part 37 may acquire the value of the quality of communication of the zone corresponding to the current position of the vehicle 2. In this case, the value of the quality of communication may be periodically updated by communication between the server 3 and the outside of the server 3. Further, the margin calculating part 37 may acquire the value of the quality of communication by calculating the value of the quality of communication based on the current position of the vehicle 2, the weather of the current position of the vehicle 2, etc.

Figure 6:
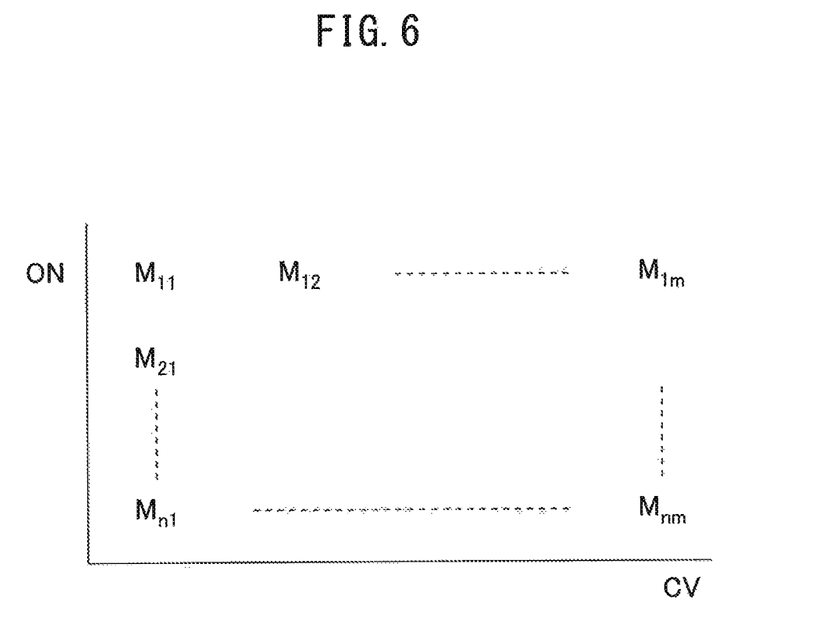
FIG. 6 is a view showing a map for calculation of an operator intervention margin.

Next, at step S103, the margin calculating part 37 calculates the margin M based on the number of available operators and the quality of communication between the server 3 and vehicle 2. For example, the margin calculating part 37 uses a map such as shown in FIG. 6 to calculate the margin M. The map, for example, is stored in the storage device 32 of the server 3.

In the map, the margin M is shown as a function of the number of available operators ON and the value of the quality of communication CV. The map is prepared so that the margin M becomes lower when the number of available operators ON is relatively small compared to when the number of available operators ON is relatively large. That is, the margin calculating part 37 lowers the margin when the number of available operators is relatively small compared to when the number of available operators is relatively large.

Further, the map is prepared so that the margin M becomes lower when the value of the quality of communication CV is relatively small compared with when the value of the quality of communication CV is relatively large. In other words, the map is prepared so that the margin M becomes lower when the quality of communication is relatively poor compared to when the quality of communication is relatively good. That is, the margin calculating part 37 lowers the margin when the quality of communication between the server 3 and the vehicle 2 is relatively poor compared to when the quality of communication between the server 3 and the vehicle 2 is relatively good. After step S103, the control routine ends.

Figure 7:
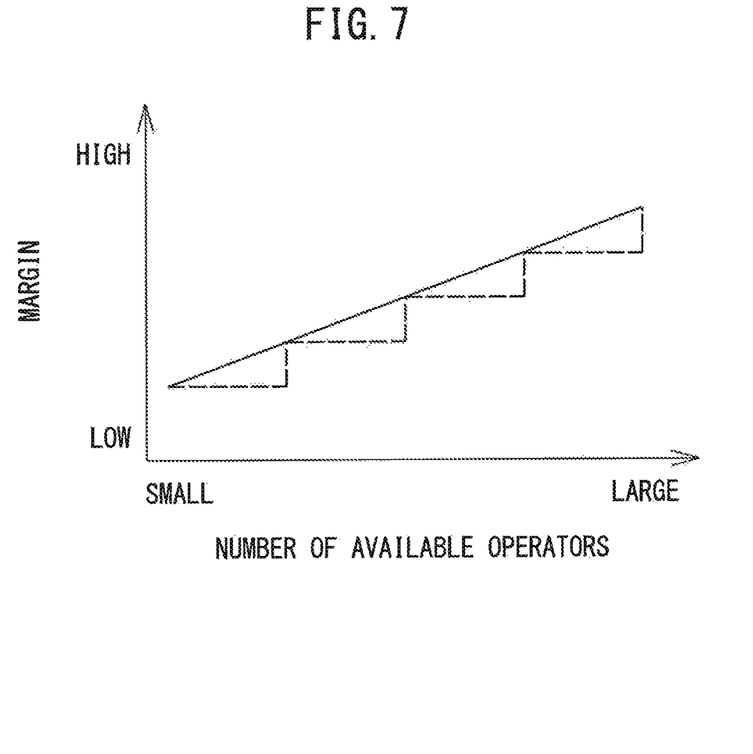
FIG. 7 is a view showing a relationship between the number of available operators and an operator intervention margin.

Note that, step S102 may be omitted. In this case, at step S103, the margin calculating part 37 calculates the margin based on the number of available operators. Specifically, when the number of available operators is relatively low, the margin calculating part 37 lowers the margin compared with when the number of available operators is relatively large. For example, as shown in FIG. 7 by the solid line, the margin calculating part 37 linearly lowers the margin as the number of available operators becomes smaller. Further, as shown in FIG. 7 by the broken line, the margin calculating part 37 may lower the margin in stages (in steps) as the number of available operators becomes smaller.

Figure 8:
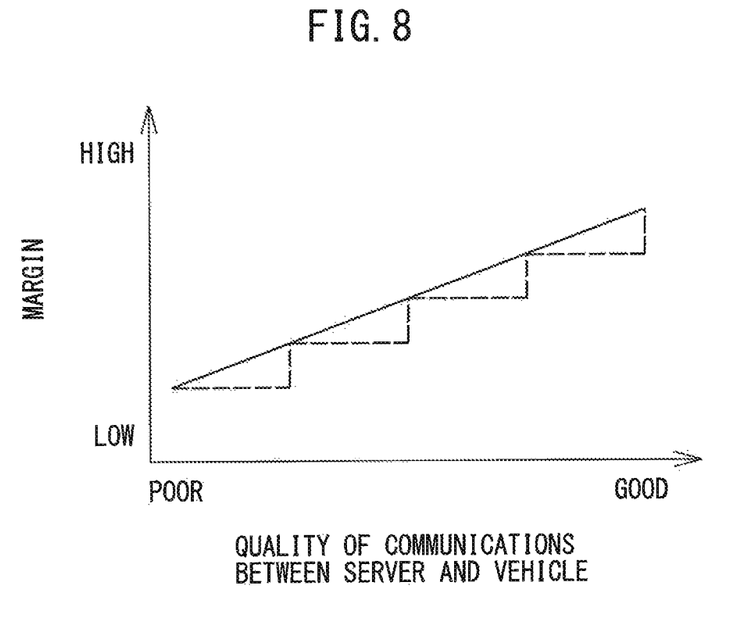
FIG. 8 is a view showing a relationship between a quality of communication between a server and vehicle and an operator intervention margin.

Further, step S101 may be omitted. In this case, at step S103, the margin calculating part 37 calculates the margin based on the quality of communication between the server 3 and the vehicle 2. Specifically, when the quality of communication is relatively poor, the margin calculating part 37 lowers the margin compared with when the quality of communication is relatively good. For example, as shown in FIG. 8 by the solid line, the margin calculating part 37 linearly lowers the margin as the quality of communication becomes poorer. Further, as shown in FIG. 8 by the broken line, the margin calculating part 37 may lower the margin in stages (in steps) as the quality of communication becomes poorer.

<Vehicle Remote Control>

Figure 9:
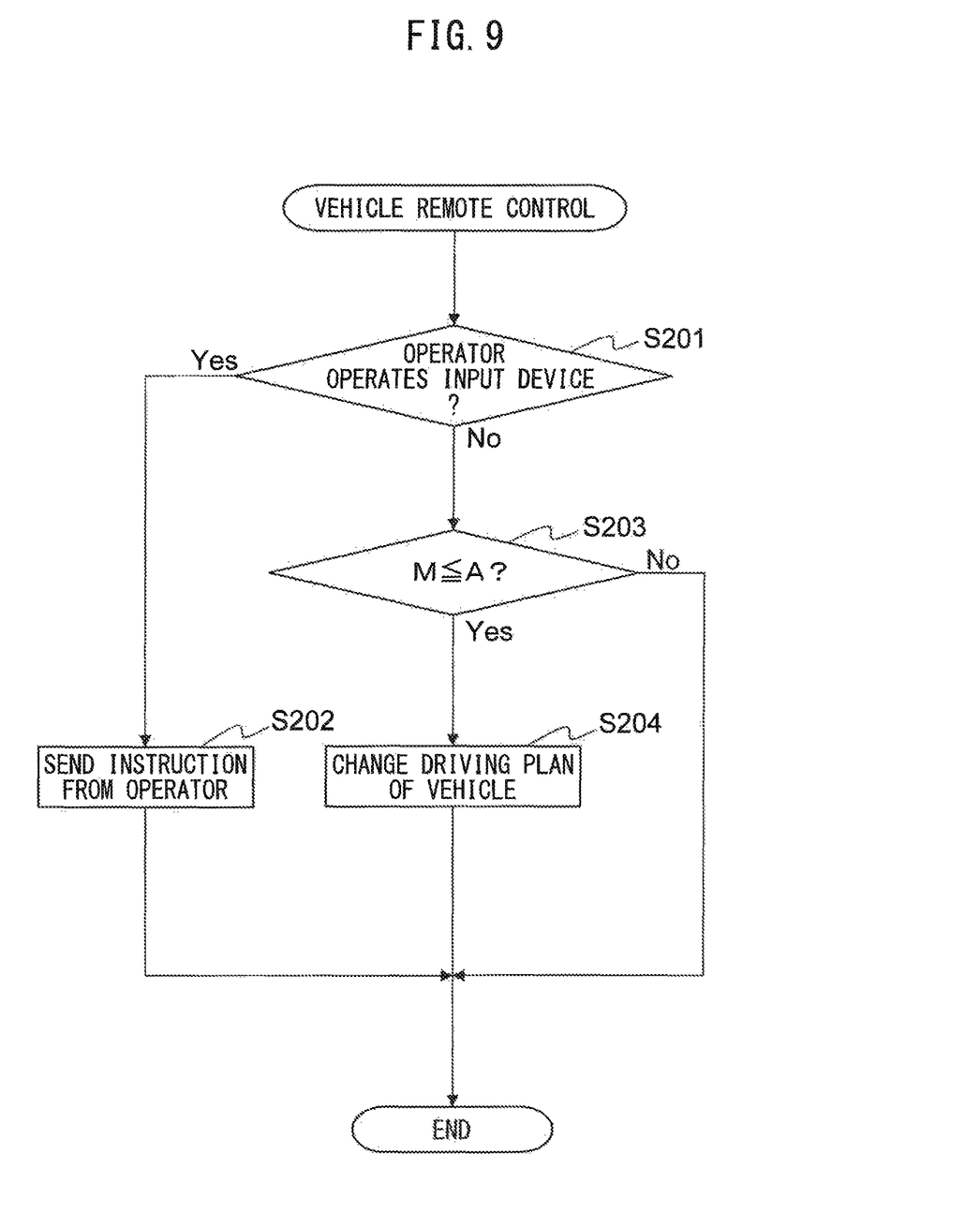
FIG. 9 is a flow chart showing a control routine of vehicle remote control in a first embodiment.

FIG. 9 is a flow chart showing a control routine of vehicle remote control in the first embodiment. The control routine is repeatedly performed by the processor 36 of the server 3, specifically the instructing part 38, at predetermined intervals.

First, at step S201, the instructing part 38 judges whether the operator is operating the input device 35. If an operation signal corresponding to operation by an operator is emitted from the input device 35, the instructing part 38 judges that the operator is operating the input device 35. On the other hand, the instructing part 38 judges that the operator is not operating the input device 35 if an operation signal corresponding to operation by an operator is not emitted from the input device 35.

If at step S201 it is judged that the operator is operating the input device 35, the control routine proceeds to step S202. At step S202, the instructing part 38 sends an instruction from the operator to the vehicle 2. Specifically, the instructing part 38 sends the vehicle 2 an operation signal corresponding to operation of the input device 35 by the operator. In this case, the ECU 70 controls the vehicle 2 (specifically, the actuator 25) based on an operation signal sent from the server 3. After step S202, the control routine ends.

On the other hand, if at step S201 it is judged that an operator is not operating the input device 35, the control routine proceeds to step S203. At step S203, the instructing part 38 judges whether the margin M calculated at step S103 of FIG. 5 is equal to or less than a predetermined value A. If it is judged that the margin M is higher than the predetermined value A, the control routine ends. On the other hand, if it is judged that the margin M is equal to or less than the predetermined value A, the control routine proceeds to step S204.

At step S204, the instructing part 38 sends the vehicle 2 an instruction for changing the driving plan of the vehicle 2. For example, the instructing part 38 sends the vehicle 2 an instruction for making the vehicle 2 stop. In this case, the ECU 70 makes the vehicle 2 stop at a stoppable position (for example, a road shoulder etc.) immediately or within a predetermined time. By doing this, when the margin is low, the safety of the vehicle 2 can be secured. Note that, if the operator operates the input device 35 so as to make the vehicle 2 start to move after stopping, the vehicle 2 can again autonomously run toward the destination.

Further, if a confidence showing the possibility of the vehicle 2 being able to continue autonomous driving without intervention by an operator (below, simply referred to as the "confidence") is high, the need for intervention by an operator is low. For this reason, at step S204, the instructing part 38 may send the vehicle 2 an instruction for changing the driving route of the vehicle 2 so that the confidence becomes higher. In this case, the ECU 70 makes the vehicle 2 autonomously run along the changed driving route. By doing this, even when the margin is low, autonomous driving of the vehicle 2 can be safely continued.

In this case, the confidence is determined in advance for each route and is stored in the storage device 32. For example, the confidence is set so as to become higher the greater the information on the route. Further, the confidence may be set so as to become higher the higher the ratio of the straight parts in the route. Further, the confidence may be set so as to become higher the fewer the number of intersections in the route.

The instructing part 38 compares the confidence of the route determined in advance as the driving route of the vehicle 2 and the confidence of an alternative route close to the driving route and, if the confidence of the alternative route is higher than the confidence of the predetermined route, sends the vehicle 2 an instruction for changing the driving route of the vehicle 2 to the alternative route. That is, the instructing part 38 sends the vehicle 2 an instruction for changing the driving route of the vehicle 2 from a route with a relatively low confidence to a route with a relatively high confidence. Note that, the confidence may be periodically updated by communication between the server 3 and the outside of the server 3 etc.

Further, if limiting the speed of the vehicle 2, the possibility of the vehicle 2 being able to continue autonomous driving without intervention by an operator becomes higher. For this reason, at step S204, the instructing part 38 may send the vehicle 2 an instruction for lowering the upper limit speed of the vehicle 2. In this case, the ECU 70 makes the vehicle 2 autonomously run so that the speed of the vehicle 2 becomes equal to or less than the changed upper limit speed. By doing this, even when the margin is low, autonomous driving of the vehicle 2 can be safely made to continue. After step S204, the control routine ends.

Second Embodiment

The configuration and control of a remote control system and self-driving system according to a second embodiment are basically the same as the first embodiment except for the points explained below. For this reason, below, the second embodiment of the present disclosure will be explained focusing on parts different from the first embodiment.

In the first embodiment, when the margin is equal to or less than a predetermined value, an instruction for making the vehicle 2 stop is transmitted to the vehicle 2. However, it is not absolutely necessary to make the vehicle 2 stop when the confidence is high. In some embodiments, to enhance the convenience of the vehicle 2, the autonomous driving of the vehicle 2 being interrupted is avoided as much as possible. For this reason, in the second embodiment, if the confidence is equal to or less than a threshold value and the margin is equal to or less than a predetermined value, the instructing part 38 sends the vehicle 2 an instruction for making the vehicle 2 stop. By doing this, it is possible to secure the safety of the vehicle 2 while reducing the frequency of autonomous driving of the vehicle 2 being interrupted.

<Vehicle Remote Control>

Figure 10:
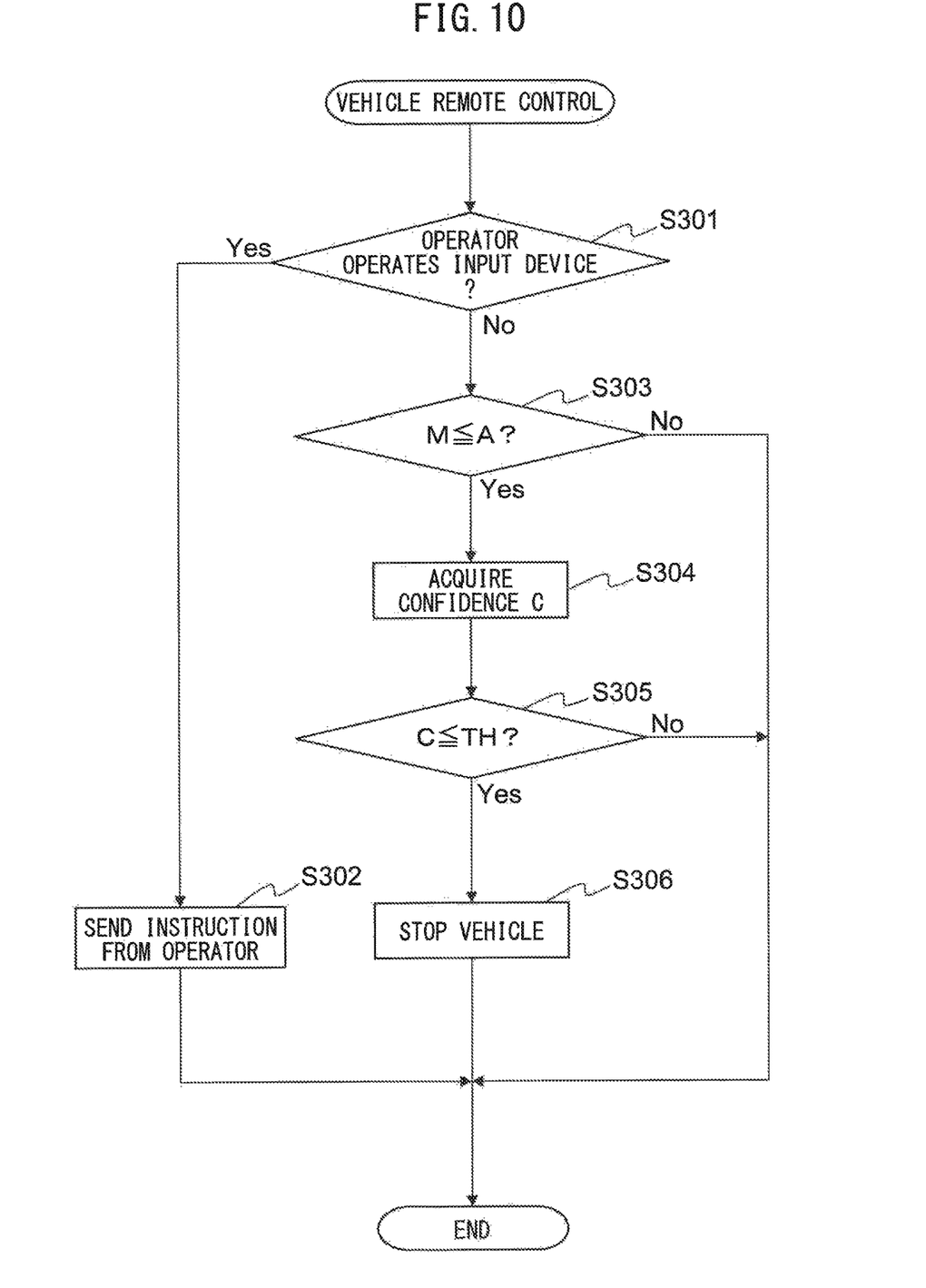
FIG. 10 is a flow chart showing a control routine of vehicle remote control in a second embodiment.

FIG. 10 is a flow chart showing a control routine of vehicle remote control in a second embodiment. The control routine is repeatedly performed by the processor 36 of server 3, specifically the instructing part 38, at predetermined intervals.

Step S301 to step S303 are performed in the same way as step S201 to step S203 of FIG. 9. If at step S303 it is judged that the margin M is equal to or less than the predetermined value A, the control routine proceeds to step S304.

At step S304, the instructing part 38 acquires a confidence C. The confidence C is determined in advance for each route and stored in the storage device 32. For example, the confidence C is set to become higher the greater the information on the route. Further, the confidence C may be set to become higher the higher the ratio of straight parts in the route. Further, the confidence C may be set to become higher the smaller the number of intersections in the route. Note that, the confidence C may be periodically updated by communication between the server 3 and the outside of the server 3 etc.

Next, at step S305, the instructing part 38 judges whether the confidence C is equal to or less than a threshold value TH. The threshold value TH is determined in advance. If it is judged that the confidence C is higher than the threshold value TH, the control routine ends. On the other hand, if the confidence C is equal to or less than the threshold value TH, the control routine proceeds to step S306.

At step S306, the instructing part 38 sends the vehicle 2 an instruction for making the vehicle 2 stop. In this case, the ECU 70 makes the vehicle 2 stop at a stoppable position (for example, a road shoulder etc.) immediately or within a predetermined time. By doing this, when the margin and confidence are low, the safety of the vehicle 2 can be secured. Note that, if the operator operates the input device 35 so as to make the vehicle 2 start to move after stopping, the vehicle 2 can again autonomously run toward the destination. After step S306, the control routine ends.

Third Embodiment

The configuration and control of a remote control system and self-driving system according to a third embodiment are basically the same as the first embodiment except for the points explained below. For this reason, below, the third embodiment of the present disclosure will be explained focusing on parts different from the first embodiment.

As explained above, in some embodiments, to enhance the convenience of the vehicle 2, the autonomous driving of the vehicle 2 being interrupted is avoided as much as possible. On the other hand, if the margin is extremely low, the vehicle 2 must be made to stop to secure the safety of the vehicle 2.

Figure 11:
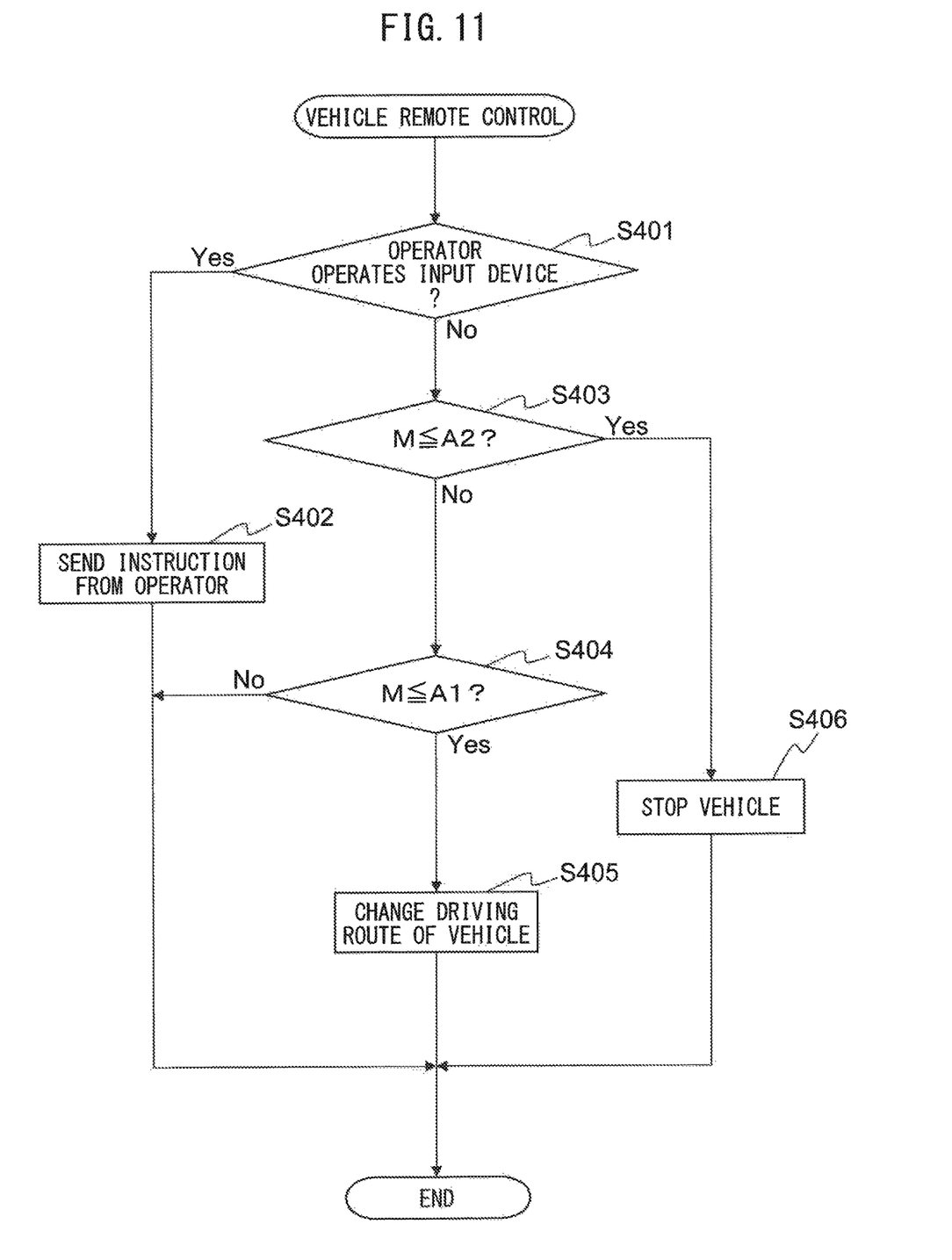
FIG. 11 is a flow chart showing a control routine of vehicle remote control in a third embodiment.

Therefore, in the third embodiment, the instructing part 38 sends the vehicle 2 an instruction for changing the driving route of the vehicle 2 so that the confidence becomes higher when the margin is equal to or less than a first predetermined value, and it sends the vehicle 2 an instruction for making the vehicle 2 stop when the margin is equal to or less than a second predetermined value. The second predetermined value is smaller than the first predetermined value. By doing this, the safety of the vehicle 2 can be secured while the frequency of the autonomous driving of the vehicle 2 being interrupted can be reduced.

<Vehicle Remote Control>

FIG. 11 is a flow chart showing a control routine of vehicle remote control in the third embodiment. The control routine is repeatedly performed by the processor 36 of server 3, specifically the instructing part 38, at predetermined intervals.

Step S401 and step S402 are performed in the same way as step S201 and step S202 of FIG. 9. If at step S401 it is judged that the operator is not operating the input device 35, the control routine proceeds to step S403.

At step S403, the instructing part 38 judges whether the margin M is equal to or less than a second predetermined value A2. If it is judged that the margin M is equal to or less than the second predetermined value A2, the control routine proceeds to step S406.

At step S406, the instructing part 38 sends the vehicle 2 an instruction for making the vehicle 2 stop. In this case, the ECU 70 makes the vehicle 2 stop at a stoppable position (for example, a road shoulder etc.) immediately or within a predetermined time. By doing this, when the margin is extremely low, the safety of the vehicle 2 can be secured. Note that, if the operator operates the input device 35 so as to make the vehicle 2 start to move after stopping, the vehicle 2 can again autonomously run toward the destination. After step S406, the control routine ends.

On the other hand, if at step S403 it is judged that the margin M is higher than the second predetermined value A2, the control routine proceeds to step S404. At step S404, the instructing part 38 judges whether the predetermined value M is equal to or less than a first predetermined value A1. The first predetermined value A1 is larger than the second predetermined value A2. In other words, the second predetermined value A2 is smaller than the first predetermined value A1.

If at step S404 it is judged that the margin M is higher than the first predetermined value A1, the control routine ends. On the other hand, if at step S404 it is judged that the margin M is equal to or less than the first predetermined value A1, the control routine proceeds to step S405.

At step S405, the instructing part 38 sends the vehicle 2 an instruction for changing the driving route of the vehicle 2 so that the confidence becomes higher. In this case, the ECU 70 makes the vehicle 2 autonomously run along the changed driving route. By doing this, even when the margin is low, autonomous driving of the vehicle 2 can be safely continued.

The confidence is determined in advance for each route and is stored in the storage device 32. For example, the confidence is set so as to become higher the greater the information on the route. Further, the confidence may be set so as to become higher the higher the ratio of the straight parts in the route. Further, the confidence may be set so as to become higher the fewer the number of intersections in the route.

The instructing part 38 compares the confidence of the route set in advance as the driving route of the vehicle 2 and the confidence of an alternative route near the driving route and if the confidence of the alternative route is higher than the confidence of the route set in advance, sends the vehicle 2 an instruction for changing the driving route of the vehicle 2 to the alternative route. That is, the instructing part 38 sends the vehicle 2 an instruction for changing the driving route of the vehicle 2 from a route with a relatively low confidence to a route with a relatively high confidence. Note that, the confidence may be periodically updated by communication between the server 3 and the outside of the server 3. After step S405, the control routine ends.

Other Embodiments

Above, embodiments according to the present disclosure were explained, but the present disclosure is not limited to these embodiments and can be corrected and changed in various ways within the language of the claims.

For example, when communication between the vehicle 2 and the server 3 cannot be secured for equal to or more than a predetermined time, the ECU 70 of the vehicle 2 may control the actuator 25 so as to make the vehicle 2 stop at a stoppable position (for example, the road shoulder etc.).

Further, the above-mentioned embodiments can be freely combined. For example, in the control routine of FIG. 11, instead of step S406, step S304 to step S306 of FIG. 10 may be performed. That is, the instructing part 38 may send the vehicle 2 an instruction for making the vehicle 2 stop if the confidence is equal to or less than the threshold value and the margin is equal to or less than the second predetermined value.

Further, in the above explanation, processing performed between the vehicle 2 and the server 3 was explained, but similar processing is also performed between other vehicles remotely controlled by the server 3 and the server 3.

REFERENCE SIGNS LIST 1 self-driving system
2 vehicle
3 server
31 communication interface
35 input device
36 processor
37 margin calculating part
38 instructing part
70 electronic control unit (ECU)

The invention claimed is:

1. A remote control system able to remotely control an autonomously driving vehicle, comprising:
  a communication device able to communicate with the vehicle;
  an input device to be operated by an operator for intervening in control of the vehicle;
  a margin calculating part configured to calculate an operator intervention margin showing a possibility of an operator being able to intervene in control of the vehicle; and
  an instructing part configured to send the vehicle instructions relating to control of the vehicle through the communication device, wherein
  the instructing part is configured to send the vehicle instructions from the operator when the input device is operated by the operator and send the vehicle an instruction for changing a driving plan of the vehicle when the operator intervention margin is equal to or less than a predetermined value.

2. The remote control system according to claim 1, wherein the margin calculating part is configured to lower the operator intervention margin when the number of operators able to operate the input device for intervening in control of the vehicle is relatively small compared to when the number of operators is relatively large.

3. The remote control system according to claim 1, wherein the margin calculating part is configured to lower the operator intervention margin when a quality of communication between the remote control system and the vehicle is relatively poor compared with when the quality of communication is relatively good.

4. The remote control system according to claim 1, wherein the instructing part is configured to send the vehicle an instruction for making the vehicle stop when the operator intervention margin is equal to or less than the predetermined value.

5. The remote control system according to claim 4, wherein the instructing part is configured to send the vehicle an instruction for making the vehicle stop when a confidence showing a possibility of the vehicle being able to continue autonomous driving without intervention by the operator is equal to or less than a threshold value and the operator intervention margin is equal to or less than the predetermined value.

6. The remote control system according to claim 1, wherein when the operator intervention margin is equal to or less than the predetermined value, the instructing part is configured to send the vehicle an instruction for changing a driving route of the vehicle so that a confidence showing a possibility of the vehicle being able to continue autonomous driving without intervention by the operator becomes higher.

7. The remote control system according to claim 1, wherein
the instructing part is configured to send the vehicle an instruction for changing a driving route of the vehicle so that a confidence showing a possibility of the vehicle being able to continue autonomous driving without intervention by the operator becomes higher when the operator intervention margin is equal to or less than a first predetermined value, and send the vehicle an instruction for making the vehicle stop when the operator intervention margin is equal to or less than a second predetermined value, and
the second predetermined value is smaller than the first predetermined value.

8. The remote control system according to claim 1, wherein when the operator intervention margin is equal to or less than the predetermined value, the instructing part is configured to send the vehicle an instruction for lowering an upper limit speed of the vehicle.

9. A self-driving system comprising an autonomously driving vehicle and a remote control system able to remotely control the vehicle, wherein
the remote control system comprises:
a communication device able to communicate with the vehicle;
an input device to be operated by an operator for intervening in control of the vehicle;
a margin calculating part configured to calculate an operator intervention margin showing a possibility of an operator being able to intervene in control of the vehicle, and
an instructing part configured to send the vehicle instructions relating to control of the vehicle through the communication device; and
the instructing part is configured to send the vehicle instructions from the operator when the input device is operated by the operator and send the vehicle an instruction for changing a driving plan of the vehicle when the operator intervention margin is equal to or less than a predetermined value.

10. A remote control system able to remotely control an autonomously driving vehicle, comprising:
a communication device able to communicate with the vehicle;
an input device to be operated by an operator for intervening in control of the vehicle; and
an electronic control unit, wherein
the electronic control unit is configured to calculate an operator intervention margin showing a possibility of an operator being able to intervene in control of the vehicle; send the vehicle instructions relating to control of the vehicle through the communication device, send the vehicle instructions from the operator when the input device is operated by the operator, and send the vehicle an instruction for changing a driving plan of the vehicle when the operator intervention margin is equal to or less than a predetermined value.

\* \* \* \* \*